US012780231B2

(12) United States Patent
Barth et al.

(10) Patent No.: US 12,780,231 B2
(45) Date of Patent: Nov. 3, 2026

(54) DRIVER-SPECIFIC SAFETY SYSTEMS FOR VEHICLES

(71) Applicant: Aptiv Technologies AG, Schaffhausen (CH)

(72) Inventors: Alexander Barth, Wermelskirchen (DE); Lukas Hahn, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 77 days.

(21) Appl. No.: 18/791,522

(22) Filed: Aug. 1, 2024

(65) Prior Publication Data

US 2025/0256733 A1 Aug. 14, 2025

Related U.S. Application Data

(60) Provisional application No. 63/552,550, filed on Feb. 12, 2024.

(51) Int. Cl.
*B60W 50/12* (2012.01)
*B60R 25/04* (2013.01)
(Continued)

(52) U.S. Cl.
CPC ............. *B60W 50/12* (2013.01); *B60R 25/04* (2013.01); *B60W 40/08* (2013.01); *B60W 50/14* (2013.01); *B60W 2040/0818* (2013.01); *B60W 2050/0073* (2013.01); *B60W 2050/146* (2013.01); *B60W 2540/043* (2020.02); *B60W 2720/106* (2013.01)

(58) Field of Classification Search
CPC ...... B60W 50/12; B60W 40/08; B60W 50/14; B60W 2540/043; B60W 2040/0818; B60W 2050/0073; B60W 2050/146; B60W 2720/106; B60R 25/04
See application file for complete search history.

(56) References Cited

U.S. PATENT DOCUMENTS

2018/0037113 A1 2/2018 Kim
2018/0339706 A1* 11/2018 Biondo ................ B60W 50/10
(Continued)

OTHER PUBLICATIONS

Extended European Search Report for EP24208168.5 dated Mar. 17, 2025, 10 pages.
(Continued)

*Primary Examiner* — Andrew J Cromer
(74) *Attorney, Agent, or Firm* — Miller Johnson

(57) ABSTRACT

A computerized method of adapting operation of a vehicle includes receiving first sensor data indicating a current driving state of a driver of the vehicle. The computerized method includes determining a first deviation metric by comparing the first sensor data to a reference driving state. The computerized method also includes, in response to the first deviation metric exceeding a first threshold, signaling, to the driver via a user interface of the vehicle, intended vehicle adaptation. The computerized method includes selectively receiving, via the user interface, an overriding user input from the driver. The computerized method further includes, in response to the overriding user input being received, commencing recording driving data, including the first sensor data. The computerized method includes, in response to the overriding user input not being received, adapting operation of the vehicle.

19 Claims, 7 Drawing Sheets

(51) Int. Cl.

| | |
|---|---|
| ***B60W 40/08*** | (2012.01) |
| ***B60W 50/00*** | (2006.01) |
| ***B60W 50/14*** | (2020.01) |

(56) References Cited

U.S. PATENT DOCUMENTS

| | | | | |
|---|---|---|---|---|
| 2019/0092342 | A1* | 3/2019 | Biondo | A61B 5/18 |
| 2020/0219197 | A1 | 7/2020 | Fields | |
| 2020/0247425 | A1* | 8/2020 | Chou | B60W 50/0098 |
| 2021/0291650 | A1 | 9/2021 | Minjeur | |
| 2022/0153302 | A1 | 5/2022 | Arechiga-Gonzalez | |

OTHER PUBLICATIONS

Jon Brodkin, "NTSB wants alcohol detection systems installed in all new cars in US," ARS Technica, https://arstechnica.com/tech-policy/2022/09/ntsb-wants-alcohol-detection-systems-installed-in-all-new-cars-in-us/; accessed Jul. 30, 2024 Sep. 21, 2022.

Wikipedia, "Ignition interlock device," https://en.wikipedia.org/wiki/Ignition_interlock_device; accessed Jul. 30, 2024.

Communication pursuant to Article 94(3) EPC for EP EP24208168.5, dated Mar. 18, 2026, 6 pages.

* cited by examiner

DRIVER-SPECIFIC SAFETY SYSTEMS FOR VEHICLES

CROSS-REFERENCE TO RELATED APPLICATIONS

This application claims the benefit of U.S. Provisional Application No. 63/552,550 filed Feb. 12, 2024, the entire disclosure of which is incorporated by reference.

FIELD

The present disclosure relates to vehicle safety systems and more particularly to driver-specific automatic safety mechanisms.

BACKGROUND

A driver may be considered impaired when unable to operate a vehicle with proper care and attention, such as when drowsy, distracted, or under the influence of a mind altering substance—for example, alcohol, drugs, medications, etc.—that can impact the driver's ability to operate a vehicle. Driver impairment can be detected based on measuring a driver's blood alcohol level prior to allowing the driver to operate the vehicle. The driver's blood alcohol level may be required to be below a certain threshold—such as a threshold required under a law or regulation—when operating a vehicle. Ignition interlock systems are generally used to enforce the requirement. Ignition interlock systems, however, have drawbacks, including that they cannot account for driver impairment that may occur after ignition but during a drive.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method of adapting operation of a vehicle includes receiving first sensor data indicating a current driving state of a driver of the vehicle. The computerized method includes determining a first deviation metric by comparing the first sensor data to a reference driving state. The computerized method also includes, in response to the first deviation metric exceeding a first threshold, signaling, to the driver via a user interface of the vehicle, intended vehicle adaptation. The computerized method includes selectively receiving, via the user interface, an overriding user input from the driver. The computerized method further includes, in response to the overriding user input being received, commencing recording driving data, including the first sensor data. The computerized method includes, in response to the overriding user input not being received, adapting operation of the vehicle.

In other features, the computerized method includes receiving identification data of the driver of the vehicle, selecting a user profile from a set of user profiles based on the received identification data. The reference driving state is based on the selected user profile. In other features, recording the driving data includes recording the identification data. In other features, adapting operation of the vehicle includes imposing at least one of an upper speed limit or an upper acceleration limit. In other features, adapting operation of the vehicle includes preventing movement of the vehicle. In other features, adapting operation of the vehicle includes preventing ignition of an engine of the vehicle.

In other features, when the first deviation metric exceeds the first threshold but not a second threshold greater than the first threshold, adapting operation of the vehicle includes imposing at least one of an upper speed limit or an upper acceleration limit. When the first deviation metric exceeds the second threshold, adapting operation of the vehicle includes preventing movement of the vehicle. In other features, the computerized method includes in response to the overriding user input being received, adapting operation of the vehicle, when the overriding user input has been received, adapting operation of the vehicle includes imposing at least one of an upper speed limit or an upper acceleration limit, and when the overriding user input has not been received, adapting operation of the vehicle includes preventing movement of the vehicle.

In other features, the driving data includes video data of a passenger compartment of the vehicle. In other features, the computerized method includes stopping recording the driving data in response to an ignition off event of the vehicle. In other features, the computerized method includes, in response to the first deviation metric exceeding the first threshold, commencing recording driving data, including the first sensor data.

In other features, the computerized method includes identifying whether a present set of conditions is consistent with at least one of a set of defined emergencies. In response to identifying that the present set of conditions is consistent with at least one of the set of defined emergencies, suppressing the adaptation of operation of the vehicle. In other features, the identifying is performed in response to the overriding user input being received.

In other features, the computerized method includes, subsequent to receiving the first sensor data receiving second sensor data indicating a current driving state of the driver. Determining a second deviation metric based on comparing the second sensor data to the reference driving state. In response to the second deviation metric exceeding the first threshold, adapting operation of the vehicle. In other features, the current driving state is based on at least one of lane usage, proximity to other vehicles, statistical measures of acceleration, steering wheel contact, brake pedal contact, or accelerator pedal contact.

In other features, the computerized method includes, prior to an ignition on event of the vehicle, receiving second sensor data indicating a state of the driver; determining a second deviation metric by comparing the second sensor data to the reference driving state; in response to the second deviation metric exceeding a second threshold signaling, to the driver via the user interface, intended vehicle adaptation; selectively receiving, via the user interface, the overriding user input from the driver; and, in response to the overriding user input not being received, adapting operation of the vehicle. In other features, the state of the driver is based on at least one of posture, head movement, pupil dilation, or eyelid movement patterns.

A computer system includes memory hardware configured to store instructions and processor hardware configured to execute the instructions. The instructions include receiving first sensor data indicating a current driving state of a driver of a vehicle. The instructions include determining a first deviation metric by comparing the first sensor data to a reference driving state. The instructions also include, in response to the first deviation metric exceeding a first threshold, signaling, to the driver via a user interface of the vehicle, intended vehicle adaptation. The instructions include selectively receiving, via the user interface, an overriding user input from the driver. The instructions include, in response to the overriding user input being received, commencing recording driving data, including the first sensor data. The instructions further include, in response to the overriding user input not being received, adapting operation of the vehicle.

In other features, the instructions include receiving identification data of the driver of the vehicle, selecting a user profile from a set of user profiles based on the received identification data. The reference driving state is based on the selected user profile.

A non-transitory computer-readable medium storing processor-executable instructions. The instructions includes receiving first sensor data indicating a current driving state of a driver of a vehicle. The instructions include determining a first deviation metric by comparing the first sensor data to a reference driving state. The instructions also include, in response to the first deviation metric exceeding a first threshold, signaling, to the driver via a user interface of the vehicle, intended vehicle adaptation. The instructions include selectively receiving, via the user interface, an overriding user input from the driver. The instructions include, in response to the overriding user input being received, commencing recording driving data, including the first sensor data. The instructions also include, in response to the overriding user input not being received, adapting operation of the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Overview

Figure 1A:
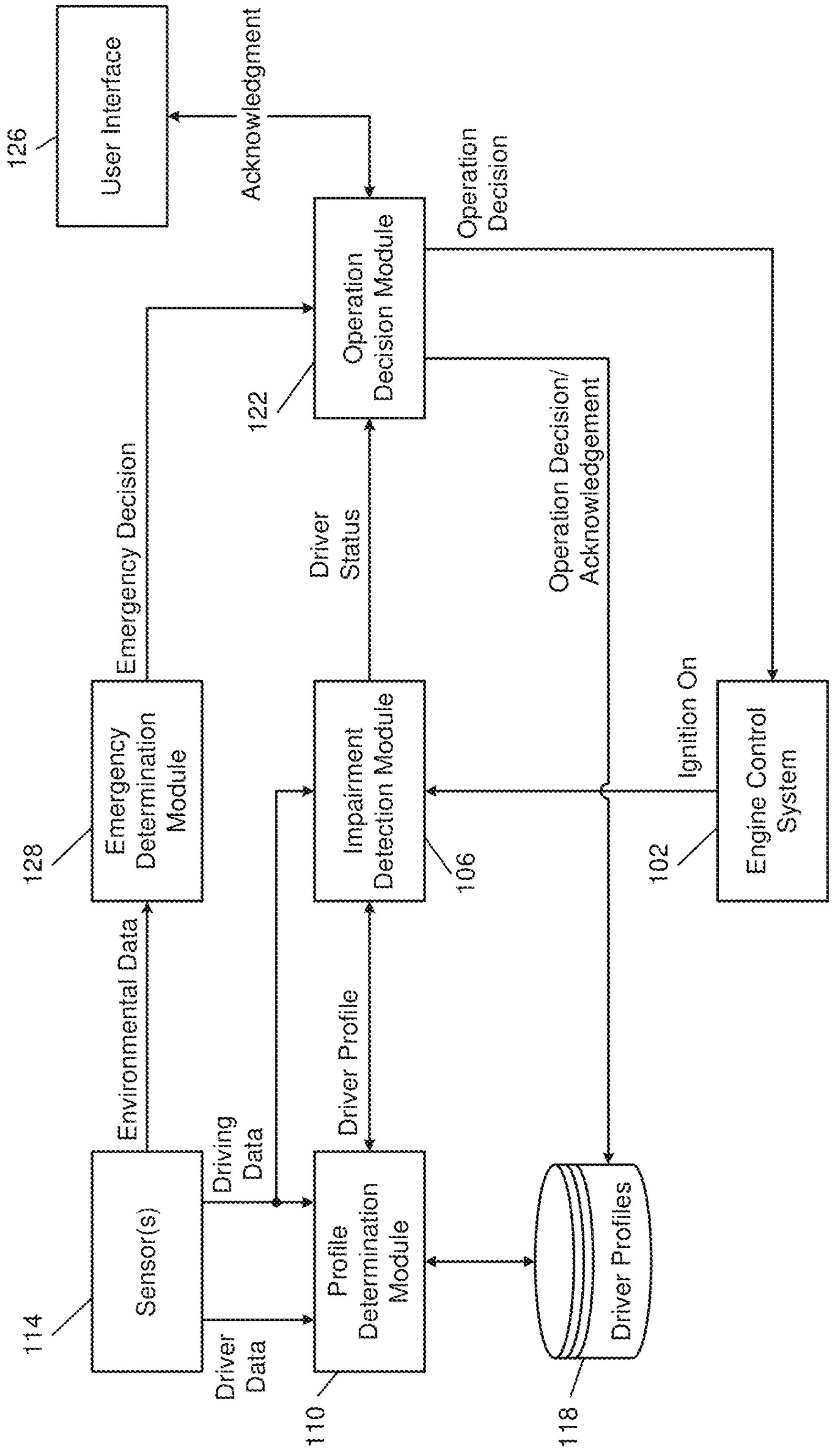
FIG. 1A is a block diagram illustrating an overview of an architecture for an impairment detection system according to aspects of the present disclosure.

An impairment detection system for a driver of a vehicle uses sensor data collected from sensors within the vehicle to monitor the driver's characteristics. The sensor data is compared to expected data for a non-impaired driver to determine whether the driver is impaired. For example, vehicle sensors may monitor driver and driving characteristics such as acceleration behavior, positioning of the vehicle with respect to the lanes, steering wheel usage, facial features, posture, eye gaze, eyelid movement, pupil dilation, head movement, head pose, body pose, pulse, vital signs, etc. The characteristics are compared to the expected data to determine whether a driver is impaired. The driver may be prevented from operating the vehicle—or other remedial action taken—if the driver is determined to be impaired.

In various implementations, the system assumes that all drivers have similar behavior and characteristics. However, to reduce the likelihood of false positives or false negatives created by individual characteristics that differ from the norm, the impairment detection system may be calibrated for individual drivers based on driver characteristics and driving patterns learned for the driver over time. For example, the impairment detection system may create a driver profile for each new driver. A basic profile can be adapted and calibrated for each individual driver using driver-specific information. For example, the basic profile can be modified for the individual driver using the driver and driving characteristics derived from the vehicle sensors. The driver-specific profile may be adapted and calibrated over time based on observing the driver's characteristics during a set of initial drives. In various implementations, the use of the driver-specific profile may be deferred until it is considered to be complete. The driver-specific profile may be considered to be complete based on completion criteria—for example, rules such as number of drives (which may be a unit of measurement from ignition on to ignition off), amount of sensor readings for characteristics, and amount of driving time monitored. Even after being considered complete, a driver-specific profile may continue to be adapted. In various implementations, the driver-specific profile may be a machine learning model that is initially trained based on the sensor data and then, after the completion criteria are satisfied, retrained based on subsequent sensor data.

When a driver is detected in the vehicle, the impairment detection system may compare indicators of driver identity to the driver profiles in the database. For example, identifying characteristics may include height, weight, age, ethnicity, facial features, fingerprint profile, etc. In addition, the vehicle may include technological identification steps, such as consulting an association of specific keys to one or more corresponding drivers. For example, each specific key may be used over time by a particular driver.

If a matching completed profile is found, the impairment detection system may obtain sensor data indicating the driver's driving characteristics, such as eye gaze, head pose, body pose, pulse, vital signs, positioning of the vehicle when driving in a lane, steering wheel usage, etc. The driving characteristics may be compared with the driver profile for that driver to determine deviations, if any, from the driver profile. The deviations may indicate impairment of the driver. In various implementations, impairment is determined in response to the deviations exceeding a predetermined threshold or confidence level. The impairment detection process can be repeated at predetermined intervals to continually monitor for impairment. In various implementations, the impairment detection process may be initiated in response to occurrence of a trigger condition. For example, the trigger condition may include exceeding the speed limit by more than a predetermined amount, excessive changes in speed or direction, driving outside of lane markings, and atypical steering wheel contact.

Remedial action may be performed in response to a detected impairment of the driver. Remedial action may include adaptation of vehicle operation, such as preventing operation of the vehicle altogether if the impairment is found before driving. Vehicle operation adaption may include limiting the operation of the vehicle, for example, by setting/imposing an upper speed limit, setting/imposing a limit on acceleration, etc. In various implementations, complete prevention of vehicle operation may only be performed when the ignition is first turned on; in other implementations, complete prevention of vehicle operation may be performed once the vehicle is shifted into park. In various implementations, complete prevention of vehicle operation may require additional conditions to be met, such as a determination that the vehicle is not present in a roadway (or a roadway with a speed limit above a threshold), a determination that the driver is no longer sitting in the driver's seat, etc.

In various implementations, the driver may be provided a visual or verbal message indicating the determination of impairment via a user interface. In various implementations, the driver may be given the option to affirm lack of impairment. In response to receiving an indication from the driver affirming lack of impairment, the impairment detection system may allow the driver to operate the vehicle, though perhaps with adapted vehicle operation as described above. In various implementations, the impairment detection system may collect driving data during the impairment detection and the subsequent drive. The collected driving data may be used to further refine the driver-specific profile for the driver. For example, the impairment detection system may compare the collected driving data to the driver-specific profile to determine whether the detected impairment was a false positive. In response to determining that the detected impairment was a false positive, the driver-specific profile may be refined based on the collected driving data to allow for the deviation in driving without triggering a finding of impairment.

In various implementations, the impairment detection system may allow the driver to affirm a need to operate the vehicle due to an emergency condition (for example, environmental conditions, flood, fire, hurricane, medical emergency, etc.) and operation of the vehicle may be allowed—again, perhaps with adapted vehicle operation. In various implementations, vehicle operation may only be allowed—or only be allowed without adaptation—if the emergency can be confirmed beyond a particular confidence level, which may vary with the emergency condition. In some examples, the impairment detection system may receive environmental data (such as from vehicle sensors and/or a processor of the vehicle) to confirm existence of the emergency. For example, the impairment detection system may cause the processor to receive pictures of the areas surrounding the vehicle from sensors of the vehicle or from other sources (such as other vehicles) to determine whether there is a fire nearby as indicated by the driver's response. As another example, the processor may receive pictures of the passenger compartment including the passengers of the vehicle from internal vehicle cameras to assess whether there is an emergency (such as a medical emergency) as indicated in the driver's response. In yet another example, the processor may receive weather data and/or news data associated with the location of the vehicle.

The processor may process the environmental data to determine whether an emergency exists. The processor may be configured to apply a set of rules to determine consistence with an emergency of a defined set of emergencies. The rules may include analyzing the environmental data for predefined signs of the emergencies, such as fog, fire, heavy rain, rotating column of air, fear, blood, weather forecasts, weather warnings, etc. In various implementations, a machine learning model may be trained to determine existence of emergencies based on the set of rules. The processor may provide to the impairment detection system a message indicating whether the emergency exists. In various implementations, the message may also include a confidence level for the existence of the emergency, a warning level for the emergency, and/or a type of emergency. The processor may be a part of the vehicle sensors or impairment detection system or be distinct from either of the foregoing. The impairment detection system may determine whether to override adaptation of the operation of the vehicle based on the output of the processor.

In various implementations, the impairment detection system may record sensor data (including, for example, interior video data) in response to the driver affirming vehicle operation following a determination that the driver is impaired.

The data may then be preserved and, upon request (for example, pursuant to a subpoena), provided to government authorities. In various implementations, vehicle operation may be prevented in response to the confidence level of impairment exceeding a first threshold; vehicle operation may be adapted (such as by limiting top speed) in response to the confidence level exceeding a second threshold but not the first threshold. In response to the confidence level of impairment exceeding a third threshold (that is lower than both the first and second thresholds), the impairment detection system may be triggered to record sensor data.

Example Environment

FIG. 1A is an overview of an architecture for an impairment detection system according to aspects of the present disclosure. The impairment detection system may be within a vehicle, such as a car, a boat, a motorcycle, or any other object/device, operation of which requires an operator/driver to be unimpaired under certain laws and/or regulations. A driver may be considered impaired when unable to operate a vehicle with proper care and attention, such as when drowsy, distracted, or under the influence of a mind altering substance—for example, alcohol, drugs, medications, etc.—that can impact the driver's ability to operate the vehicle. A driver impairment can correspond to the driver being unfit to operate the vehicle. In various implementations, the vehicle may be autonomous or semi-autonomous, and these implementations may use different thresholds for adaptation of vehicle operation. For example, adapting operation of an autonomous vehicle may require a higher confidence that the driver is impaired, given that the autonomous vehicle may be able to perform driving functions with minimal or no input from the driver.

The vehicle may include internal and/or external sensor(s) 114 configured to measure and provide driver data and driving data to assist in detecting impairment of a driver of the vehicle. For example, the sensor(s) 114 may include cameras configured to detect the driver's characteristics. The driver data includes identifying data used for identifying the driver and selecting a profile. The driver data also includes operational data indicating a state of the driver.

Identifying data may include one or more of facial features, ethnicity, gender, approximate weight, approximate height, etc. Operational data may include one or more of acceleration behavior, positioning of the vehicle with respect to the lanes, steering wheel usage, eye gaze, pupil dilation, head pose, body pose, etc.

The sensor(s) 114 may include sensors positioned within the vehicle interior in proximity of the driver when the driver is seated in the driver seat. In various implementations, the sensor(s) 114 may include sensors located on or within the steering wheel, the accelerator, and/or the brake pedal of the vehicle configured to monitor the driving behavior of a driver. In various implementations, the sensor(s) 114 may also include exterior cameras located on the vehicle configured to detect and monitor outside conditions around the vehicle, such as, positioning of the vehicle with respect to the lanes, location of the vehicle with respect to other vehicles, and environmental data (for example, floods, fires, accidents, etc.).

The vehicle may include an engine control system 102, an impairment detection module 106, a profile determination module 110, a database 118, and an operation decision module 122. The engine control system 102 may include one or more processors or control systems to control operations of the vehicle, including ignition, fuel delivery, acceleration, steering, etc. An ignition may have two modes/positions: on and off. The engine control system 102 may communicate a state of the vehicle ignition with the impairment detection module 106.

The impairment detection module 106 may be configured to determine a driver status for the driver based on a driver profile and the driving data and driver data of the driver. When the ignition is turned on or in the on position, the impairment detection module 106 may initiate the impairment detection process by requesting a driver profile for the driver from the profile determination module 110. The profile determination module 110 may request and receive driver data from the sensor(s) 114. The driver data may include identifying features of the driver. The profile determination module 110 may compare the driver data with driver profiles stored in the database 118. The database 118 may store driver profiles for each known driver of the vehicle. Each driver profile may be specific to and associated with a driver.

A driver profile may include a set of identifying characteristics and a reference state of the driver. The reference state of the driver may include a reference driver state based on characteristics such as expected eye gaze, head pose, body pose, resting pulse, and resting vital signs. The reference state of the driver may also include a reference driving state based on characteristics such as positioning of the vehicle when driving in a lane, steering wheel usage, peak lateral acceleration, accelerator pedal and brake pedal usage, etc. The reference state of the driver may be adapted and calibrated over time based on observing the driver's characteristics during a set of initial drives.

The profile determination module 110 may determine whether a driver profile in the store driver profiles exists for the driver based on the received driver data. The profile determination module 110 may further determine whether a matching driver profile is complete/ready. If the matching driver profile is found but is not complete/ready, the profile determination module 110 may request and receive driving data from the sensor(s) 114 during the subsequent drive to adapt and calibrate the matching driver profile. If a matching driver profile is not found in the database 118, the profile determination module 110 may create a new driver profile for the driver, mark it as incomplete/not ready, and use driver data and the driving data received from the sensor(s) 114 during the subsequent drive to adapt and calibrate the driver profile to the driver.

The impairment detection module 106 may receive the driver profile for the driver—for example, the existing matching driver profile, the new driver profile, etc.—from the profile determination module 110 and driving data from the sensor(s) 114 during the subsequent drive. The impairment detection module 106 may be configured to determine a driver status based on the driving data and the driver profile. The driver status may indicate that the driver is impaired, the driver is not impaired, or undecided. The undecided driver status may indicate that enough data has not been collected for the driver to make a decision regarding the driver's impairment status. When the driver profile received by the impairment detection module 106 is marked as not ready/incomplete, the impairment detection module 106 may determine the driver status of the driver to be undecided.

In response to the received driver profile being marked as complete/ready, the impairment detection module 106 may be configured to compare the driving data, including the driving characteristics, received from the sensor(s) 114 with the reference driving state of the driver in the driver profile to determine deviations, if any, from the driver profile. The deviations may indicate impairment of the driver. In various implementations, the impairment detection module 106 may be configured to calculate or determine a deviation metric based on the deviations from the driver profile. The deviation metric may, in some examples, be a number of deviations from the driver profile. In some examples, the deviation metric may be another metric defined by an operator of the impairment detection module 106. In various implementations, the impairment detection module 106 may be configured to determine that a driver is impaired in response to the deviations/deviation metric exceeding a predetermined threshold or confidence level. The impairment detection module 106 may be configured to output a confidence level associated with its detection of impairment. The confidence level may be a percentage confidence of the impairment detection module 106 that its determination of impairment is accurate. The impairment detection module 106 may provide the driver status as impaired along with an associated confidence level to the operation decision module 122 to make operational decisions regarding operation of the vehicle.

In various implementations, the impairment detection module 106 may be configured to repeat the impairment detection process at predetermined intervals to continually monitor for driver impairment. For example, the impairment detection module 106 may repeat the impairment detection process when the predetermined time has elapsed after conclusion of the immediately preceding impairment detection process. In various implementations, the impairment detection module 106 may be configured to initiate the impairment detection process in response to occurrence of a trigger condition in the driving data received from the sensor(s) 114. For example, the trigger condition may include exceeding the speed limit by more than a predetermined amount, excessive changes in speed or direction, driving outside of lane markings, and atypical steering wheel contact.

The operation decision module 122 may receive the driver status from the impairment detection module 106 and determine an operation decision for operation of the vehicle. In various implementations, the operation decision module 122 may determine the operation decision to allow or permit the operation of the vehicle based on the received driver status being undecided or unimpaired. The operation decision module 122 may also, in the operation decision, instruct the engine control system 102 to cause the profile determination module 110 to collect driving data from the sensor(s) during the drive to further adapt and calibrate the driver profile to the driver.

In response to the received driver status being impaired, in various implementations, the operation decision module 122 may be configured to provide to the driver a visual or verbal message indicating the determination of impairment via a transmission to a user interface 126. The user interface 126 may be a user interface within the vehicle, such as located on the vehicle dashboard, or a user interface of a user device, such as a driver's cell phone connected to the operation decision module 122. The user interface 126 may be a graphical user interface configured to communicate with other systems such as the operation decision module 122 via a wireless or wired connection. In various implementations, the driver may be given the option to affirm lack of impairment indicating the driver's wish to override the impairment detection decision. In response to receiving an indication from the driver affirming lack of impairment, the operation decision module 122 may generate the operation decision allowing/permitting the driver to operate the vehicle, though perhaps with adapted vehicle operation.

In various implementations, the operation decision may include adapted vehicle operation indicating prevention of operation of the vehicle altogether if the impairment is found before driving. Vehicle operation adaption may include limiting the operation of the vehicle by, for example, setting an upper speed limit, setting a limit on acceleration, etc. In various implementations, the operation decision module 122 may include, in the operation decision, a complete prevention of vehicle operation only when the ignition is first turned on; in other implementations, complete prevention of vehicle operation may be included in the operation decision but to be performed once the vehicle is shifted into park. In various implementations, inclusion of complete prevention of vehicle operation in the operation decision may require additional conditions to be met, such as a determination that the vehicle is not present in a roadway (or a roadway with a speed limit above a threshold), a determination that the driver is no longer sitting in the driver's seat, etc.

In various implementations, the operation decision module 122 may allow the driver to affirm, via a communication from the user interface 126, a need to operate the vehicle due to an emergency condition (for example, environmental conditions, flood, fire, hurricane, medical emergency, etc.). The operation decision module 122 may determine that operation of the vehicle may be allowed—again, perhaps with adapted vehicle operation. In various implementations, the operation decision may only include allowing/permitting vehicle operation—or only including allowing/permitting operation without adaptation—if the emergency is included in a set of potential emergencies under which override of impairment decision is allowable and the emergency is confirmed beyond a particular confidence level, which may vary with the emergency condition.

In some examples, the operation decision module 122 may request a determination from an emergency determination module 128 to determine whether the emergency actually exists. The emergency determination module 128 may request and receive environmental data (such as from the sensor(s) 114 and/or a processor of the vehicle) to confirm existence of the emergency. For example, the emergency determination module 128 may receive pictures of the areas surrounding the vehicle from the sensor(s) 114 or from other sources (such as other vehicles) to determine whether there is a fire nearby. As another example, the emergency determination module 128 may receive pictures of the passengers of the vehicle from the sensor(s) 114 such as internal vehicle cameras to assess whether there is an emergency (such as a medical emergency). In yet another example, the emergency determination module 128 may receive weather data and/or news data associated with the location of the vehicle from other processor(s) of the vehicle.

The emergency determination module 128 may be configured to receive and process the pictures, weather data, and/or news data (collectively, "environmental data") to determine whether an emergency exists. The emergency determination module 128 may be configured to apply a set of rules to the environmental data to determine consistency of the environmental data with an emergency from a set of defined emergencies. For example, the rules may include analyzing the received environmental data for predefined signs of emergencies, such as fog, fire, heavy rain, rotating column of air, screaming passengers, crying passengers, excessive bleeding, weather forecasts, weather warnings, etc. Each defined emergency may be associated with a set of criteria including rules for confirming its existence. In various implementations, a machine learning model may be trained to determine a comparison score between the environmental data and the defined emergencies based on the set of rules.

The emergency determination module 128 may provide to the operation decision module 122 a message indicating whether the emergency exists based on the comparison score. In various implementations, the message may also include a confidence level for the existence of the emergency, a warning level for the emergency, and/or a type of emergency. While the emergency determination module 128 is functionally depicted as being separate from the impairment detection module 106, in various implementations, the emergency determination module 128 may be a part of the impairment detection module 106.

The operation decision module 122 may determine whether to override adaptation of the operation of the vehicle based on an emergency decision received from the emergency determination module 128. For example, if the operation decision indicates that an emergency exists with a confidence level of more than a defined threshold, the operation decision module 122 may allow the driver to operate the vehicle—perhaps with adapted vehicle operation.

In various implementations, the operation decision module 122 may also include in the operation decision an instruction to record sensor data (including, for example, interior video data) collected from the sensor(s) 114 in response to the driver affirming vehicle operation following a determination that the driver is impaired. The operation decision module 122 may then be configured to provide the records data, upon request (for example, pursuant to a subpoena), to government authorities. The records data may be automatically deleted once expired.

In various implementations, the operation decision module 122 may be configured to determine the operation decision based on the confidence level of impairment included in the driver status. For example, the operation decision module 122 may be configured to determine operation decision as preventing vehicle operation in response to the confidence level of impairment exceeding a first threshold; adaption of the vehicle operation (such as by limiting top speed) in response to the confidence level exceeding a second threshold but not the first threshold. In response to the confidence level of impairment exceeding a third threshold (that is lower than both the first and second thresholds), the operation decision module 122 may include, in the operation decision, recording the drive.

In various implementations, the operation decision module 122 may include in the operation decision instructions to collect driving data from the sensor(s) 114 during the impairment detection and the subsequent drive. The collected driving data may be used by the profile determination module 110 to further refine the driver profile for the driver. For example, the profile determination module 110 may compare the collected driving data to the driver profile to determine whether the detected impairment was a false positive. In response to determining that the detected impairment was a false positive, the driver profile may be adapted and/or calibrated based on the collected driving data to allow for the detected deviation in driving without triggering a detection of impairment for future implementations of the impairment detection process.

The engine control system 102 may be configured to receive the operation decision from the operation decision module 122 and cause the decision to be implemented by the engine control system 102 and/or other components of the impairment detection system. For example, based on the operation decision including allowing/permitting operation or adapted operation of the vehicle and recording sensor data, the engine control system 102 may allow/permit the operation of the vehicle and cause the profile determination module 110 to collect sensor data received from the sensor (s), refine the driver profile based on the sensor data, and/or store the recorded data and refined driver profile in the database 118.

Profile Determination Module

Figure 1B:
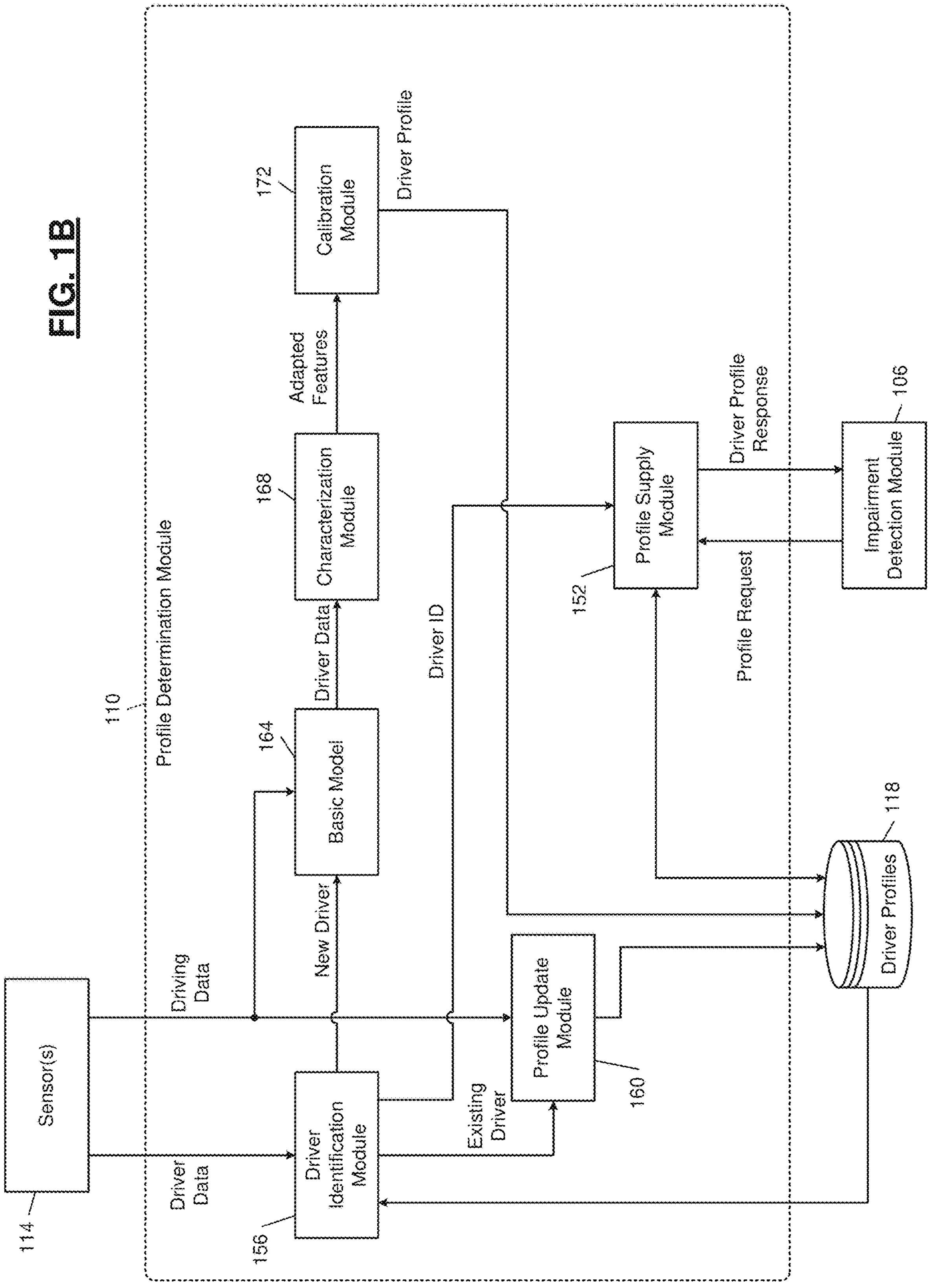
FIG. 1B is a block diagram of an example implementation of a profile determination module according to aspects of the present disclosure.

FIG. 1B is an example implementation of a profile determination module 110 according to aspects of the present disclosure. The profile determination module 110 may receive a profile request from the impairment detection module 106. The profile determination module 110 may include a profile supply module 152, a driver identification module 156, a basic model 164, a characterization module 168, a calibration module 172, and a profile update module 160. The profile supply module 152 may be configured to communicate with the impairment detection module 106. The profile supply module 152 may receive a profile request from the impairment detection module 106 and provide a driver profile response to the impairment detection module 106. In response to receiving a profile request from the impairment detection module 106, the profile supply module 152 may request a driver profile from the driver identification module 156 using a driver ID for the driver.

The driver identification module 156 may request and receive driver data from the sensor(s) 114 in response to receiving the profile request. The driver identification module 156 may request and receive driver profiles stored in the database 118. The driver identification module 156 may be configured to compare the driver data with driver profiles to determine whether a matching driver profile exists for the driver in the database 118. The driver profiles stored in the database 118 may each be associated with a driver of the vehicle and include identifying characteristics and a reference driving state of the driver. In various implementations, the driver profiles may also be marked as complete or incomplete indicating whether the driver profile meets a completion criteria for use of the driver profile for the impairment detection purposes. For example, the completion criteria may include rules such as number of drives (which may be a unit of measurement from ignition on to ignition off), amount of sensor readings for characteristics, and amount of driving time monitored required for a driver profile to be based on sufficient data to be useful in impairment detection. In various implementations, the driver profiles may each be a machine learning model that is trained based on the sensor data including driver identifying characteristics and driving characteristics learned from reference drives conducted by the driver associated with the driver profile.

The driver identification module may compare the driver data received from the sensor(s) 114 with the identifying characteristics for each of the driver profiles to determine whether a matching driver profile exists in the database 118. In response to determining that a driver profile exists for the driver, the driver identification module 156 may provide the existing driver profile to the profile update module 160 and a driver identification to the profile supply module 152. The profile supply module 152 may retrieve the driver profile from the database 118 based on the driver identification and provide the driver profile to the impairment detection module 106 as driver profile response for impairment detection.

The profile update module 160 may request and receive driving data from sensor(s) 114 for the subsequent drive. The profile update module 160 may update the driver profile based on the received driving data. In various implementations, the profile update module 160 may be configured to retrain, adapt and/or calibrate the existing driver profile based on the driving data. For example, if the driver profile is marked as incomplete, the profile update module 160 may collect sensor data including driving data indicating the current driving state of the driver during the subsequent drive and adapt the existing driver profile based on the collected sensor data. In various implementations, the profile update module 160 may further monitor and keep track of the number of drives (which may be a unit of measurement from ignition on to ignition off), the amount of sensor readings for characteristics, and amount of driving time monitored and used for creation and/or adaptation of the driver profile.

In various implementations, if the driver profile is marked as complete/ready, the profile update module 160 may use the sensor data collected from the subsequent drive to update the driver profile. For example, the driver profile may be a machine learning model that is initially trained based on the previously collected sensor data during the reference drives and then, after the completion criteria are satisfied, retrained based on subsequent sensor data. The profile update module 160 may transmit the updated driver profile to the database 118 for storage and future use. The database 118 may replace the existing driver profile with the updated driver profile.

In response to determining that a driver profile for the driver does not exist in the database 118, the driver identification module 156 may indicate to the profile supply module 152 that a driver profile does not exist and cause the basic model 164 to create a new driver profile for the driver. The profile supply module 152 may transmit a driver profile response to the impairment detection module 106 indicating that a driver profile does not yet exist for the driver. The basic model 164 may be configured to create a basic driver profile for each new driver detected in the vehicle. The basic driver profile may include basic features that are predetermined based on an assumption that all drivers have similar behavior and characteristics. In various implementations, the basic features may be different for different groups of people, such as those based on gender, age, ethnicity, height, etc. The characterization module 168 may take as input the driver data including the driver's identifying characteristics and the basic driver profile. The characterization module 168 may adapt the basic features of the basic driver profile based on the driver's identifying characteristics to generate adapted features for the driver profile.

The adapted driver profile may be further calibrated for the driver by the calibration module 172 based on driving data collected from the sensor(s) 114 during the subsequent drive. For example, the calibration module 172 may collect sensor data from a number of reference drives of the driver without employing the impairment indemnification process and calibrate the driver profile based on the driver's driving characteristics. It may be assumed that the driver is not impaired during the reference drives. In various implementations, reference drives may only include drives when the probability of the driver being impaired is low such as based on time of day. The calibration may be performed by a processor within the vehicle or a processor located at a remote location such as a cloud processor. In various implementations, drives may only be considered reference drives if verified by a dealership, using the user interface 126, such as by verifying that the driver is not impaired. In various implementations, the adaptation module and the calibration module 172 may train the machine learning model such as the basic driver profile and/or the adapted driver profile based on sensor data collected from sensor(s) 114 including the driver data and the driving data during the reference drives. Each of the basic driver profile, the adapted driver profile, and the calibrated driver profile may be a machine learning model trained using the basic features, the driver identifying features, and the driving characteristics of the driver, respectively. The calibration module 172 may provide the calibrated driver profile to the database 118 for storage and future use. The driver profile may be marked as complete once it meets the completion criteria.

In this way, the driver profile may be specifically adapted and calibrated to the personal characteristics of the user; thereby reducing false positives for impairment based on personal characteristics of drivers.

Flowcharts

Figure 2:
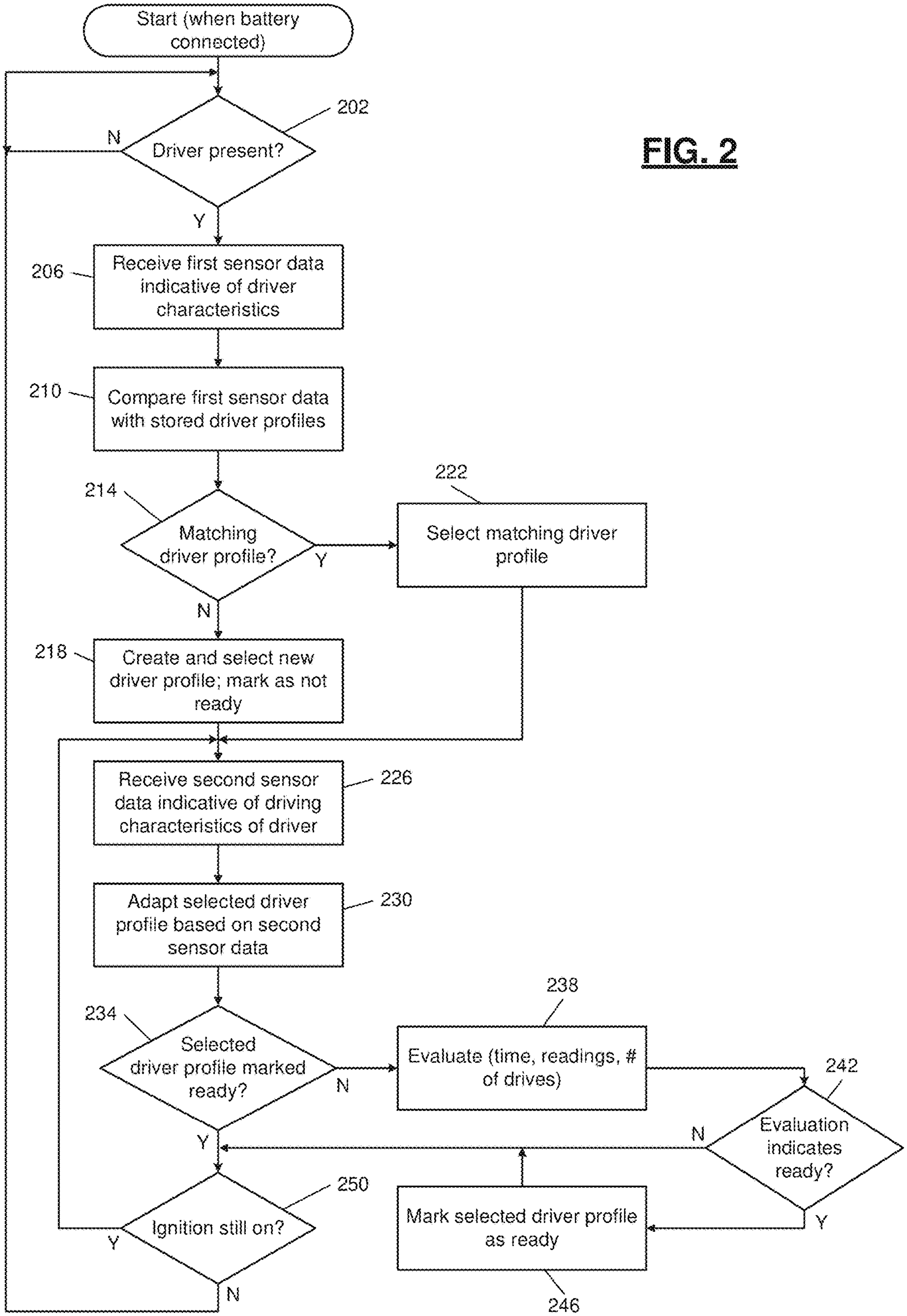
FIG. 2 is a flowchart of an example method for generating a driver profile for a driver of a vehicle according to aspects of the present disclosure.

In FIG. 2, processing—for example, by an impairment detection system when battery of a vehicle is connected—begins at 202. At 202, control determines whether a driver is present in a vehicle. If yes, control transfers to 206; otherwise control stays at 202. For example, impairment detection module 106 may begin monitoring impairment detection of a driver when engine control system 102 determines that the battery of the vehicle is connected and a driver is present in the vehicle.

At 206, control receives first sensor data indicative of driver characteristics. For example, profile determination module 110 may receive driver data including identifying characteristics of the driver (such as identification data including facial features, approximate height, weight, geometry of mouth, age, ethnicity, eye gaze, head pose, body pose, etc.) from sensor(s) 114. Control transfers to 210.

At 210, control compares first sensor data with stored driver profiles. For example, profile determination module 110 may compare the driver data with driver profiles stored in database 118. The database 118 may include one or more driver profiles for associated one or more drivers of the vehicle. Control transfers to 214.

At 214, control determines whether a matching driver profile exists. If yes, control transfers to 222; otherwise control transfers to 218. For example, the profile determination module 110 may determine whether one of the driver profiles in the database 118 matches the driver based on comparing the driver data with each of the driver profiles.

At 218, control creates and selects a new driver profile and marks the new driver profile as not ready. For example, a new driver profile may be created for the driver using the basic model 164. The new driver profile may be stored in the database 118 and marked as not ready indicating that additional driving data for the driver is required to create a full driver profile. Control transfers to 226.

At 222, control selects the matching driver profile. For example, driver identification module 156 of the profile determination module 110 may select the existing driver profile that matches the driver data as the driver profile for the driver. Control transfers to 226.

At 226, control receives second sensor data indicative of driving characteristics of driver. For example, the profile determination module 110 may receive driving data from the sensor(s) 114 indicating driving characteristics such as as eye gaze, head pose, body pose, positioning of the vehicle when driving in a lane, steering wheel usage, etc. Control transfers to 230.

At 230, control adapts the selected driver profile based on second sensor data. For example, the profile update module 160 and/or the calibration module 172 may adapt the selected driver profile based on the driving characteristics of the driver. Control transfers to 234.

At 234, controls determines whether the driver profile is marked ready. For example, the driver identification module 156 may determine whether the driver profile is marked ready in database 118. If yes, control transfers to 250; otherwise control transfers to 238.

At 238, control evaluates the driver profile. For example, the driver identification module 156 may evaluate the driver profile—for example, number of drives (which may be a unit of measurement from ignition on to ignition off), amount of sensor readings for characteristics, and amount of driving time monitored for the driver. Control transfers to 242.

At 242, control determines whether the evaluation indicates that the driver profile is ready. If yes, control transfers to 246; otherwise control transfers to 250. For example, the driver identification module 156 may determine that the evaluation of the driver profile indicates that the driver profile meets a completion criteria—for example, rules such as number of drives (which may be a unit of measurement from ignition on to ignition off), amount of sensor readings for characteristics, and amount of driving time monitored—for a profile to be considered to be complete.

At 246, control marks the selected driver profile as ready. For example, the driver identification module 156 may mark the selected driver profile as complete indicating that the driver profile may be used for impairment detection. Control transfers to 250.

At 250, control determines whether ignition of the vehicle is still on. If yes, control transfers back to 226; otherwise control transfers back to 202. For example, the profile update module 160 or the calibration module 172 may continue to receive driving data and adaption the driver profile if the vehicle ignition is still turned on or in on position.

Figure 3:
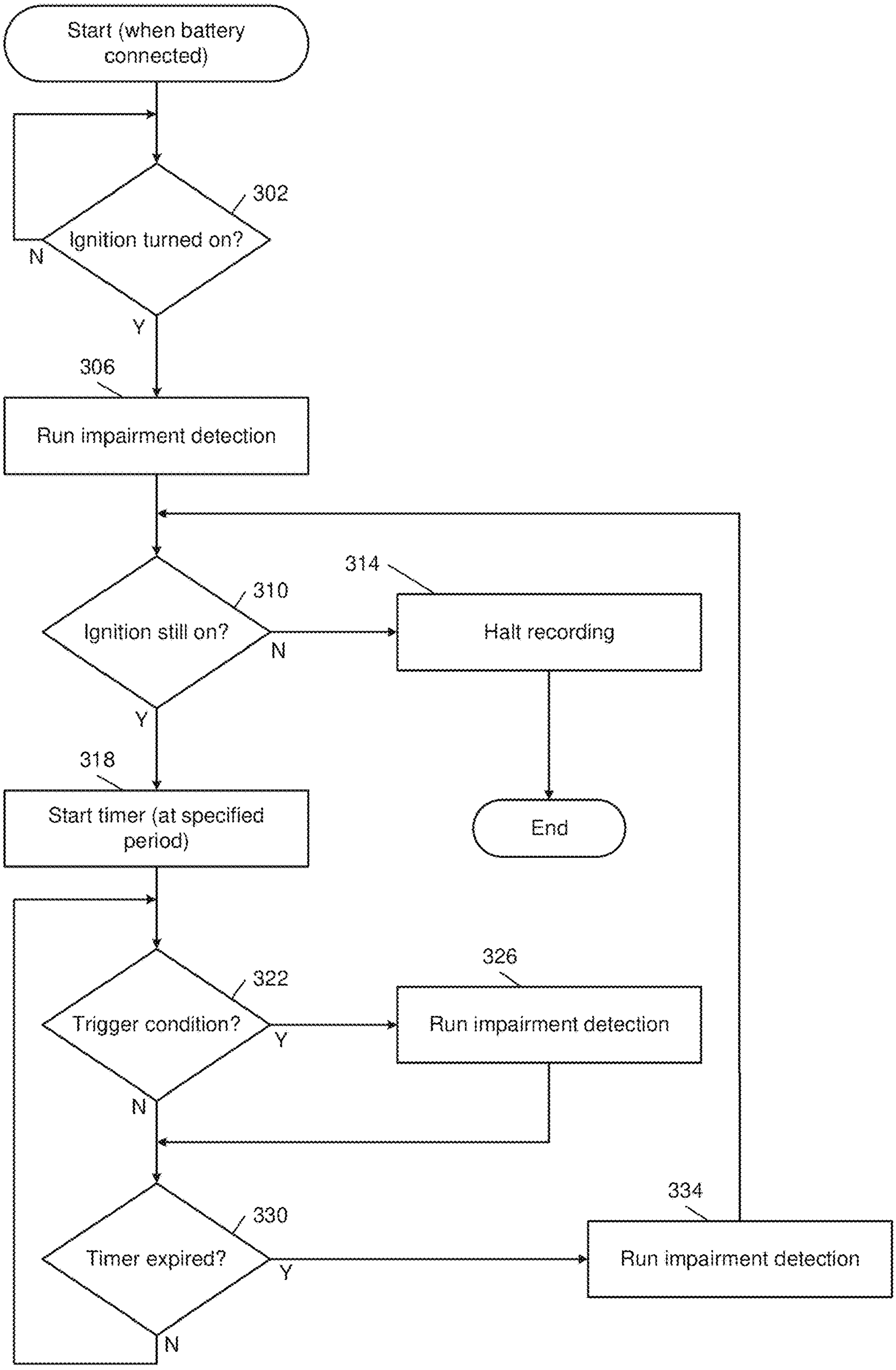
FIG. 3 is a flowchart of an example method for conducting impairment detection according to aspects of the present disclosure.

In FIG. 3, processing—for example, by an impairment detection system when battery of a vehicle is connected—begins at 302. At 302, control determines whether an ignition of a vehicle is turned on. If yes, control transfers to 306;

otherwise, control remains at 302. For example, the impairment detection module 106 begins monitoring a driver of a vehicle for impairment when the engine control system 102 indicates that the ignition of the vehicle is turned on.

At 306, control runs an impairment detection process. For example, the engine control system 102 may cause the impairment detection module 106 to run an impairment detection process (such as the process described below with respect to FIG. 4) to determine whether a driver of the vehicle is impaired when the ignition of the vehicle is turned on. Control transfers to 310.

At 310, control determines whether ignition of the vehicle is still on. If yes, control transfers to 318; otherwise control transfers to 314. At 314, control halts recording. For example, the impairment detection module may cause the sensors to stop recording driving data once the vehicle ignition is in an off position. Control then ends.

At 318, control starts a timer. For example, the impairment detection module 106 may be configured to repeat the impairment detection process at set time intervals. In that regard, the impairment detection module may start a timer—for example, at the specified time period—indicating a per-determined time interval at which impairment detection process should be repeated. Control transfers to 322.

At 322, control determines whether a trigger condition has occurred. If yes, control transfers to 326; otherwise control transfers to 330. For example, the impairment detection module 106 may be configured to repeat the impairment detection process when a trigger condition—for example, exceeding the speed limit by more than a predetermined amount, excessive changes in speed or direction, driving outside of lane markings, and atypical steering wheel contact—has been met.

At 326, controls runs an impairment detection process. For example, the impairment detection module 106 may initiate/repeat the impairment detection process (such as the process described below with respect to FIG. 4) in response to occurrence of a trigger condition. Control transfers to 330.

At 330, control determines whether the timer has expired. If yes, control transfers to 334; otherwise control transfers back to 322. For example, the impairment detection module 106 may determine when the time interval for repeating the impairment detection process has expired.

At 334, control runs an impairment detection process. For example, the impairment detection module 106 may be configured to initiate/repeat impairment detection process (such as the process described below with respect to FIG. 4) to determine whether the driver is impaired at set time intervals. Control transfers back to 310. For example, the impairment detection module 106 may initiate/repeat the impairment detection process at the set time intervals while the ignition is still on.

Figure 4:
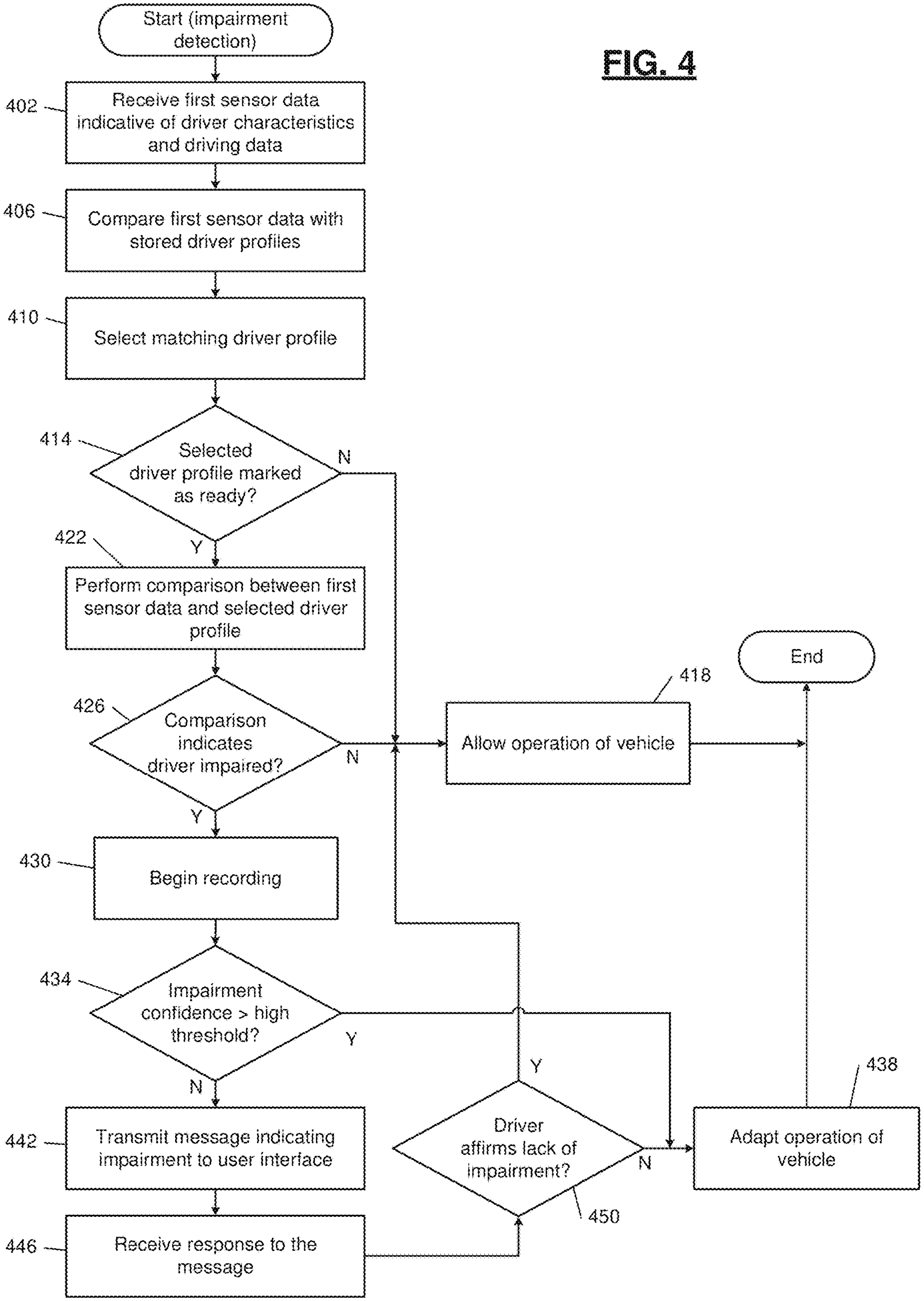
FIG. 4 is a flowchart of an example method for detecting whether a driver of a vehicle is impaired according to aspects of the present disclosure.

In FIG. 4, processing—for example, by an impairment detection system—begins at 402. At 402, control receives first sensor data indicative of drive characteristics and driving data. For example, the profile determination module 110 may receive, from sensor(s) 114 driver data indicative of a driver's identifying characteristics and driving data indicative of the driver's driving characteristics. Control transfers to 406.

At 406, control compares first sensor data with stored driver profiles. For example, the profile determination module 110 may compare the driver data with driver profiles stored in database 118. The database 118 may include one or more driver profiles for associated one or more drivers of the vehicle. Control transfers to 410.

At 410, control selects a matching driver profile. For example, the profile determination module 110 may select a driver profile from the stored driver profiles that matches the driver data based on comparing the driver data with the stored driver profiles. Control transfers to 414.

At 414, control determines whether the selected driver profile is marked as ready. If yes, control transfers to 422; otherwise control transfers to 418. For example, the driver identification module 156 may cause the impairment detection module 106 to perform impairment detection if the selected driver profile is marked as ready.

At 418, control allows operation of the vehicle by the driver. For example, the engine control system 102 may allow the driver to operate the vehicle and cause the profile update module 160 to adapt and calibrate the driver profile based on the subsequent drive. Control then ends.

At 422, control performs comparison between the first sensor data and the selected driver profile. For example, the impairment detection module 106 may compare the driving characteristics of the driver and feature(s) of the selected driver profile such as a reference driving state to determine deviations, if any, from the selected driver profile. Control transfers to 426.

At 426, control determines whether the comparison of the first sensor data and the selected driver state indicates that the driver is impaired. If yes, control transfers to 430; otherwise control transfers to 418. For example, the impairment detection module 106 may determine that the comparison between the driving characteristics in the first sensor data indicate deviations from the selected driver profile. The deviations may indicate impairment of the driver. In various implementations, impairment is determined in response to the deviations exceeding a predetermined threshold or confidence level.

At 430, control begins recording. For example, the impairment detection module 106 may be configured to cause the sensor(s) 114 to begin recording data indicative of driving characteristics of the driver in real-time in response to determining that the driver is impaired. Control transfers to 434.

At 434, control determines whether the impairment confidence is greater than a high threshold. If yes, control transfers to 438; otherwise control transfers to 442. For example, the impairment detection module 106 may determine a confidence level of impairment based on amount of deviation from the driver profile. In response to the confidence being higher than a predetermined threshold, the impairment detection module 106 may cause performance of remedial action(s).

At 438, control adapts the operation of the vehicle. For example, the operation decision module 122 may cause the engine control system 102 to adapt vehicle operation by performing remedial action(s) such as preventing operation of the vehicle altogether if the impairment is found before driving. Vehicle operation adaption may include limiting the operation of the vehicle, for example, by setting an upper speed limit, setting a limit on acceleration, etc. In various implementations, complete prevention of vehicle operation may only be performed when the ignition is first turned on; in other implementations, complete prevention of vehicle operation may be performed once the vehicle is shifted into park. In various implementations, complete prevention of vehicle operation may require additional conditions to be met, such as a determination that the vehicle is not present in a roadway (or a roadway with a speed limit above a threshold), a determination that the driver is no longer sitting in the driver's seat, etc. Control the ends.

At 442, control transmits a message indicating driver impairment to a user interface. For example, the operation decision module 122 may transmit a visual or verbal message to the driver, via the user interface 126, indicating that the determination of impairment. The driver may be given the option to affirm lack of impairment. Control transfers to 446.

At 446, control receives a response to the message. For example, the operation decision module 122 may receive a response to the transmitted message from the user interface 126. Control transfers to 450. At 450, control determines whether the driver affirms the lack of impairment. If yes, control transfers to 418; otherwise control transfers to 438. For example, the operation decision module 122 may parse the response from the user interface 126 to determine whether the driver affirmed lack of impairment. If the driver disagrees with the impairment decision, the operation decision module 99 may instruct the engine control system 102 to allow operation of the vehicle; otherwise the operation decision module 122 may instruct the engine control system 102 to adapt the operation of the vehicle. In various implementations, the impairment detection system may collect driving data during the impairment detection and the subsequent drive.

Figure 5:
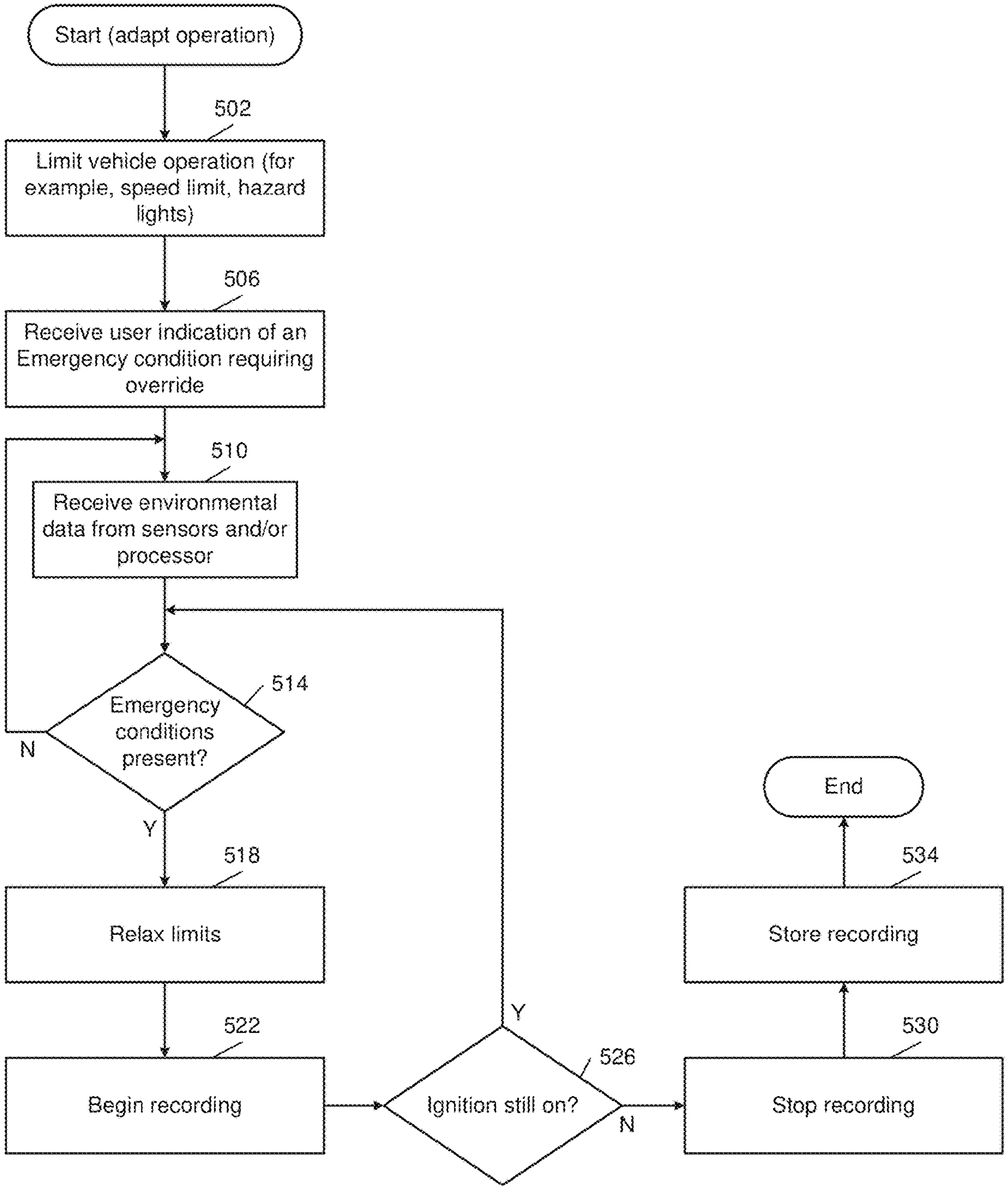
FIG. 5 is a flowchart of an example method for overriding adaptation of vehicle operation during emergency conditions according to aspects of the present disclosure.

In FIG. 5, processing—for example, by an operation decision module—begins at 502. At 502, control limits vehicle operation. For example, the operation decision module 122 may cause adaptation of vehicle including limiting the operation of the vehicle, for example, by setting an upper speed limit, setting a limit on acceleration, etc. in response to determining that the drive of the vehicle is impaired (such as using the process described with respect to FIG. 4). Control transfers to 506.

At 506, control receives user indication of an emergency condition requiring override. For example, the operation decision module 122 may receive, from the driver via the user interface 126, a message indicating existence of an emergency condition (for example, environmental conditions, flood, fire, hurricane, medical emergency, etc.), requiring an override of the adaptation of the vehicle operation. Control transfers to 510.

At 510, control receives environmental data from sensors and/or processor. For example, the operation decision module 122 may request and receive environmental data from the sensor(s) 114 and/or a processor of the vehicle. For example, the operation decision module 122 may receive pictures of the areas surrounding the vehicle from sensors of the vehicle or from other sources (such as other vehicles). As another example, the operation decision module 122 may receive pictures of the passengers of the vehicle from internal vehicle cameras. In yet another example, the operation decision module 122 may receive weather data and/or news data associated with the location of the vehicle from a processor(s) of the vehicle. Control transfers to 514.

At 514, control determines whether emergency conditions are present. If yes, control transfers to 518; otherwise control transfers back to 510. For example, the operation decision module 122 may review the environmental data to determine whether emergency conditions are present. For example, the operation decision module 122 may determine that there is fire nearby as indicated by the driver's message based on pictures of the areas surrounding the vehicle received from sensor(s) 114 or from other sources (such as other vehicles). As another example, the operation decision module 122 may determine whether a medical emergency exists based on pictures of the passengers of the vehicle received from internal vehicle cameras.

At 518, control relaxes limits on vehicle operation. For example, upon confirming that an emergency exists, the operation decision module 122 may instruct the engine control system 102 to relax the limits on the vehicle operation so that the driver may operate the vehicle in order to resolve/escape the emergency. Control transfers to 522.

At 522, control begins recording the drive. For example, the operation decision module 122 may cause the sensor(s) 114 to begin recording sensor data (including, for example, interior video data) in response to the driver operating the vehicle during the emergency. Control transfers to 526.

At 526, control determines if the ignition is still on. If yes, control transfers back to 514; otherwise control transfers to 530. For example, the operation decision module 122 may stop recording sensor data once the vehicle is no longer in operation mode (such as when the ignition is off).

At 530, control stops recording the drive. For example, the operation decision module 122 may cause the sensor(s) 114 to stop recording the sensor data once the vehicle is turned off. Control transfers to 534. At 534, control stores the recording. For example, the records sensor data may be preserved and stored in the database 118 in association with the driver profile of the driver. In various implementations, the recorded sensor data may be stored with tags for date and time. Control then ends.

Figure 6:
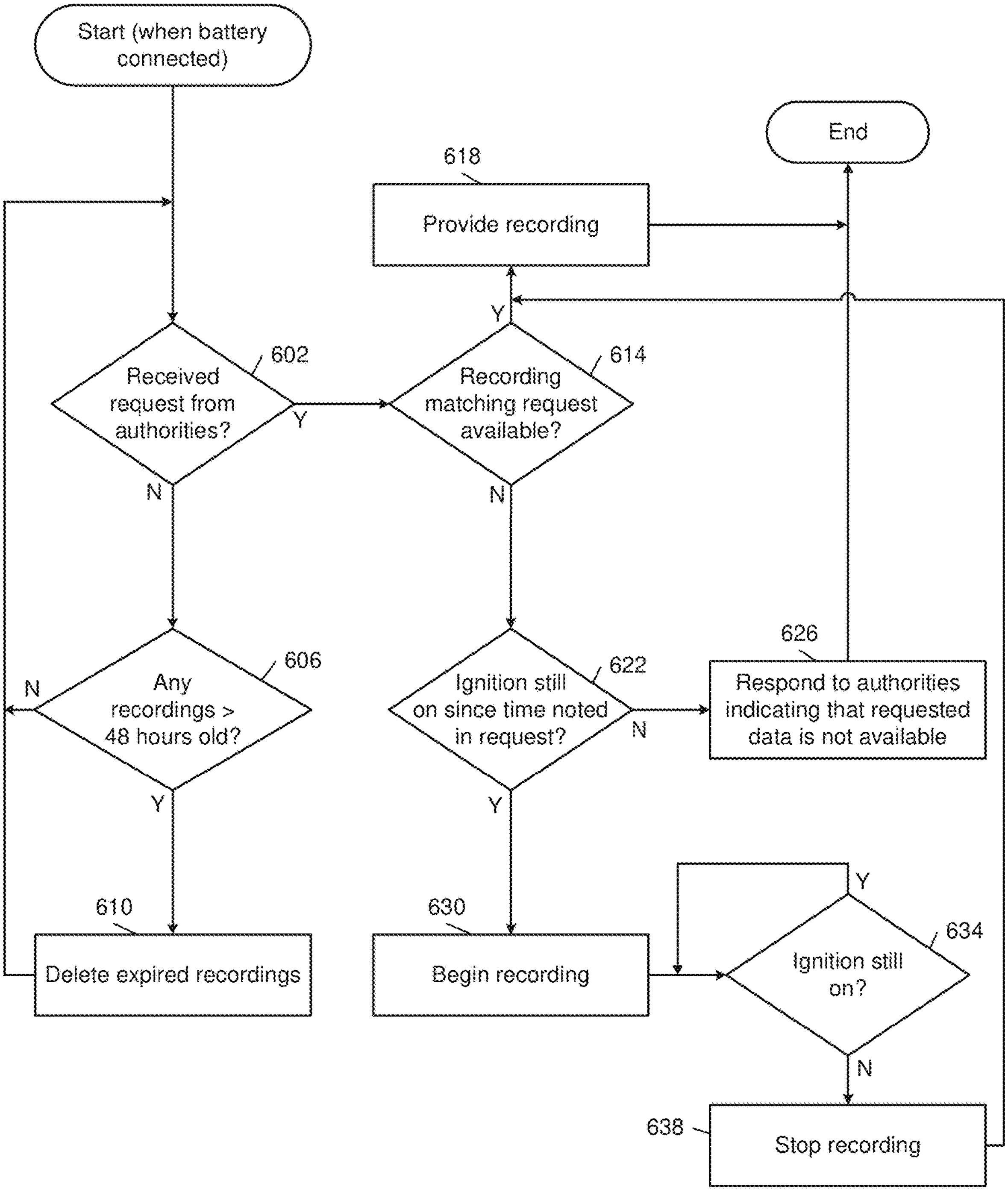
FIG. 6 is a flowchart of an example method for recording vehicle usage in order to respond to authorities according to aspects of the present disclosure.

In FIG. 6, processing—for example, by an operation decision module—begins at 602. At 602, control determines whether a request from authorities has been received. If yes, control transfers to 614; otherwise control transfers to 606. For example, the operation decision module 122 may determine whether a law enforcement authority has requested any recorded data—for example, using a subpoena.

At 606, control determines whether there are any stored recordings that are older than a threshold (for example, forty-eight hours). If yes, control transfers to 610; otherwise control transfers to 614.

At 610, control deletes the expired recordings. For example, the recording that are older than the predetermined time period may be deleted from the database 118 periodically. Control transfers back to 602.

At 614, control determines whether a recording matching the request is available. If yes, control transfers to 618; otherwise control transfers to 622. For example, the operation decision module 122 may compare the request (such as the time and date in the request) to the recordings stored in the database 118 to determine whether a recording matching the request from the authorities is available.

At 618, control provides the recording to the authorities. For example, the operation decision module may provide the matching recording to the authorities directly via electronic means or indirectly by providing it to a user interface for printing. Control then ends.

At 622, control determines whether the ignition of the vehicle is still on since the time noted in the request. If yes, control transfers to 630; otherwise control transfers to 626. For example, the operation decision module 122 may request an ignition position information from the engine control system 102 to determine whether the vehicle ignition has continuously been on since the time noted in the request received from the authorities.

At 626, control responds to the authorities indicating that the requested data is not available. For example, the operation decision module 122 may transmit a message to the authorities indicating that a recording that meets the request is not available. This message may be transmitted directly to the authorities via electronic means or indirectly via a user interface connected to the operation decision module 122, such as the user interface 126.

At 630, control begins recording the drive. For example, the operation decision module 122 may cause the sensor(s) 114 to begin recording sensor data (including, for example, interior video data) in response to the vehicle still being on since the time noted on the request. Control transfers to 634.

At 634 control determines if the ignition is still on. If yes, control remains at 634; otherwise control transfers to 638. For example, the operation decision module 122 may stop recording sensor data once the vehicle is no longer in operation mode (such as when the ignition is off).

At 638, control stops recording the drive. For example, the operation decision module 122 may stop recording the sensor data once the vehicle is turned off. Control transfers to 618.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computerized method of adapting operation of a vehicle, the computerized method comprising:

receiving identification data of a driver of the vehicle;

selecting a user profile from a set of user profiles based on the received identification data;

receiving first sensor data indicating a current driving state of the driver;

determining a first deviation metric by comparing the first sensor data to a reference driving state, wherein the reference driving state is based on the selected user profile;

in response to the first deviation metric exceeding a first threshold:

signaling, to the driver via a user interface of the vehicle, intended vehicle adaptation, selectively receiving, via the user interface, an overriding user input from the driver, in response to the overriding user input being received, commencing recording driving data, including the first sensor data, and in response to the overriding user input not being received, adapting operation of the vehicle, wherein adapting operation of the vehicle includes at least one of: imposing an upper speed limit, imposing an upper acceleration limit, preventing movement of the vehicle, or preventing ignition of an engine of the vehicle; and updating the selected user profile based on the recorded driving data.

2. The computerized method of claim 1 wherein recording the driving data includes recording the identification data.

3. The computerized method of claim 1 wherein adapting operation of the vehicle includes imposing the upper speed limit.

4. The computerized method of claim 1 wherein adapting operation of the vehicle includes preventing movement of the vehicle.

5. The computerized method of claim 1 wherein adapting operation of the vehicle includes preventing ignition of the engine of the vehicle.

6. The computerized method of claim 1 wherein adapting operation of the vehicle includes:

in response to the first deviation metric exceeding the first threshold but not a second threshold greater than the first threshold, at least one of: imposing the upper speed limit or imposing the upper acceleration limit; and in response to the first deviation metric exceeding the second threshold, preventing movement of the vehicle.

7. The computerized method of claim 1 further comprising:

in response to the overriding user input being received, adapting operation of the vehicle, wherein adapting operation of the vehicle includes:

in response to the overriding user input being received, at least one of: imposing the upper speed limit or imposing the upper acceleration limit; and in response to the overriding user input not being received, preventing movement of the vehicle.

8. The computerized method of claim 1 wherein the driving data includes video data of a passenger compartment of the vehicle.

9. The computerized method of claim 1 further comprising stopping recording the driving data in response to an ignition off event of the vehicle.

10. The computerized method of claim 1 further comprising, in response to the first deviation metric exceeding the first threshold, commencing recording driving data, including the first sensor data.

11. The computerized method of claim 1 further comprising:

identifying whether a present set of conditions is consistent with at least one of a set of defined emergencies; and in response to identifying that the present set of conditions is consistent with at least one of the set of defined emergencies, suppressing the adaptation of operation of the vehicle.

12. The computerized method of claim 11 wherein the identifying is performed in response to the overriding user input being received.

13. The computerized method of claim 1 further comprising, subsequent to receiving the first sensor data:

receiving second sensor data indicating a current driving state of the driver;

determining a second deviation metric based on comparing the second sensor data to the reference driving state; and in response to the second deviation metric exceeding the first threshold, adapting operation of the vehicle.

14. The computerized method of claim 1 wherein the current driving state is based on at least one of lane usage, proximity to other vehicles, statistical measures of acceleration, steering wheel contact, brake pedal contact, or accelerator pedal contact.

15. The computerized method of claim 1 further comprising, prior to an ignition on event of the vehicle:

receiving second sensor data indicating a state of the driver;

determining a second deviation metric by comparing the second sensor data to a reference driver state; and in response to the second deviation metric exceeding a second threshold:

signaling, to the driver via the user interface, intended vehicle adaptation, selectively receiving, via the user interface, the overriding user input from the driver, and in response to the overriding user input not being received, adapting operation of the vehicle.

16. The computerized method of claim 15 wherein the state of the driver is based on at least one of posture, head movement, pupil dilation, or eyelid movement patterns.

17. A computer system comprising:

memory hardware configured to store instructions; and processor hardware configured to execute the instructions, wherein the instructions include:

receiving identification data of a driver of a vehicle;

selecting a user profile from a set of user profiles based on the received identification data;

receiving first sensor data indicating a current driving state of the driver;

determining a first deviation metric by comparing the first sensor data to a reference driving state, wherein the reference driving state is based on the selected user profile;

in response to the first deviation metric exceeding a first threshold:

signaling, to the driver via a user interface of the vehicle, intended vehicle adaptation, selectively receiving, via the user interface, an overriding user input from the driver, in response to the overriding user input being received, commencing recording driving data, including the first sensor data, and in response to the overriding user input not being received, adapting operation of the vehicle, wherein adapting operation of the vehicle includes at least one of: imposing an upper speed limit, imposing an upper acceleration limit, preventing movement of the vehicle, or preventing ignition of an engine of the vehicle; and updating the selected user profile based on the recorded driving data.

18. A non-transitory computer-readable medium storing processor-executable instructions, the instructions comprising:

receiving identification data of a driver of a vehicle;

selecting a user profile from a set of user profiles based on the received identification data;

receiving first sensor data indicating a current driving state of the driver;

determining a first deviation metric by comparing the first sensor data to a reference driving state, wherein the reference driving state is based on the selected user profile;

in response to the first deviation metric exceeding a first threshold:

signaling, to the driver via a user interface of the vehicle, intended vehicle adaptation, selectively receiving, via the user interface, an overriding user input from the driver, in response to the overriding user input being received, commencing recording driving data, including the first sensor data, and in response to the overriding user input not being received, adapting operation of the vehicle, wherein adapting operation of the vehicle includes at least one of: imposing an upper speed limit, imposing an upper acceleration limit, preventing movement of the vehicle, or preventing ignition of an engine of the vehicle; and updating the selected user profile based on the recorded driving data.

19. The computerized method of claim 1 wherein adapting operation of the vehicle includes imposing the upper acceleration limit.

* * * * *